June 17, 1969

W. E. WALKER, JR 3,450,164

DUAL ORIFICE PLUG FITTING

Filed May 12, 1966

INVENTOR.
William E. Walker, Jr.
BY
Mildred K. Flowers
AGENT

June 17, 1969    W. E. WALKER, JR    3,450,164
DUAL ORIFICE PLUG FITTING
Filed May 12, 1966    Sheet 2 of 2

INVENTOR.
William E. Walker, Jr.
BY
Mildred H. Flowers
AGENT

United States Patent Office 3,450,164
Patented June 17, 1969

3,450,164
DUAL ORIFICE PLUG FITTING
William E. Walker, Jr., Freer, Tex., assignor to Charles Wheatley Company, Tulsa, Okla., a corporation of Oklahoma
Filed May 12, 1966, Ser. No. 549,509
Int. Cl. F15d 1/02
U.S. Cl. 138—44                                               7 Claims

ABSTRACT OF THE DISCLOSURE

A dual orifice plug fitting for a pipeline comprising an outer housing interposed in the pipeline and provided with a stationary plug body disposed therein having a bore extending therethrough in substantial alignment with the interior of the pipeline. A rotatable orifice sleeve is disposed within the housing and around the stationary plug, and is provided with a plurality of orifice plates with each orifice plate being of a different diameter. The orifice plates are movable with the rotation of the orifice sleeve for selectively positioning the orifices in alignment with the bore of the plug body for cooperation with metering ports provided in the outer housing for facilitating the measurement of pressure drop of the fluid moving through the orifice plate. The diameter size of the orifice plate through which the fluid flows may be readily altered by rotation of the orifice sleeve whereby another orifice plate is positioned in alignment with the bore of the stationary plug body.

---

This invention relates to improvement in devices for metering the flow rate of gases or fluids through conduits and more particularly, but not by way of limitation, to a dual orifice plug fitting having replaceable inserts for use in the metering of flow rates of natural gas, or the like.

In measuring large quantities of fluids, such as natural gas, it is common practice to pass the gas through a constriction or orifice in a pipe or conduit and by measuring the difference in pressure between the two sides of the constriction, the flow rate can be determined by calculation or by consulting a graph or mathematical table provided for the particular construction size. Thus, by knowing the size of the orifice, the positive pressure and the differential pressure, a flow rate for a gas of known properties may be derived by mathematical calculations or directly determined by employing established mathematical tables. Usually, the constriction or orifice used for this purpose is in the form of a round hole in a plate or hard and relatively thin metal with the plate being clamped between flanges interposed in the pipeline or conduit through which the flow is being conducted. The plate being so placed between the flanges so that the orifice is substantially concentric with the pipe eliminates lateral flow of the gases so that a true differential pressure may be read on both sides of the orifice. However, in such structures, in order to change from one orifice to another, it usually requires that flow in the conduit be shut off on each side of the flanges by means of valves or the like and then remove the bolt which holds the flanges together, remove one plate and substitute another plate therein having a different size orifice and then reconnect the flanges and open the valves which isolated the measuring device. This operation is rather slow and laborious and at times is somewhat dangerous. Further, the stoppage of flow is often highly detrimental to a particular operation in which continuous flow of gas is essential.

In order to overcome the disadvantages set forth above, a dual orifice plug fitting was developed as disclosed in copending application Ser. No. 404,016 filed Oct. 15, 1964, now Patent No. 3,321,970 and entitled "Dual Orifice Plug Fitting" of which I am a coinventor. The plug fitting disclosed in this pending application includes a plug body having intersecting bores provided therein, each bore having a replaceable orifice fitting secured in one end thereof. The plug may be rotated within an external housing for selectively positioning one or the other of the removable orifice fittings in line with the flow stream moving through the device. Certain disadvantages have become apparent in the use of this rotatable plug. For example, regardless of which bore of the plug fitting is disposed in alignment with the flow passageway of the conduit within which the plug fitting is installed, the intersecting bore is open to the flow stream substantially adjacent to the orifice fitting receiving the flow stream therethrough. As is well known, this creates an internal disturbance or turbulence within the flow stream which greatly effects the reading of the pressure of the flow stream on one side of the orifice fitting. It will be apparent that this turbulence will result in an inefficient metering of the flow rate of the gas stream.

The present invention contemplates a dual orifice plug fitting for a pipeline, conduit, or the like, particularly designed and constructed for overcoming the above disadvantages. The novel plug fitting comprises an inner stationary body having a single bore extending therethrough in alignment with the internal bore of the conduit or pipeline. A rotatable shell or sleeve is disposed around the stationary body and within an outer housing. The rotatable shell is provided with a plurality of bores which may be selectively positioned in alignment with the bore of the stationary plug whereby orifice plates or fittings of differing diameters may be placed in alignment with the flow stream for metering the flow rate of the fluid such as natural gas being handled or carried by the pipeline. The orifice fittings may be readily replaced when it is desired to alter the diameter of the orifice or in the event the fitting becomes damaged for any reason. The internal bore through the plug fitting is substantially uninterrupted or is provided with a substantially smooth periphery and is maintained at substantially the same diameter as the bore of a pipeline. Thus, the metering of the flow rate of the gas stream passing through the orifice fitting may be accomplished in a very efficient and accurate manner.

It is an important object of this invention to provide a novel dual orifice plug fitting for increasing the efficiency and accuracy of metering the flow rate of a fluid stream.

It is another object of this invention to provide a novel dual orifice plug fitting particularly designed and constructed for reducing or substantially eliminating internal turbulence within the fitting for increasing the accuracy of the metering of the rate of flow of a natural gas stream, or the like.

Another object of this invention is to provide a novel dual orifice plug fitting having dual orifice plates of differing diameters for facilitating change of orifice size without disassembly of the fitting structure.

Still another object of this invention is to provide a novel dual orifice plug fitting having replaceable orifice plates.

It is still another object of this invention to provide a novel dual orifice plug fitting which is simple and efficient in operation and economical and durable in construction.

Other and further objects and advantageous features of the present invention will hereinafter more fully appear in connection with a detailed description of the drawings in which.

Figure 1:
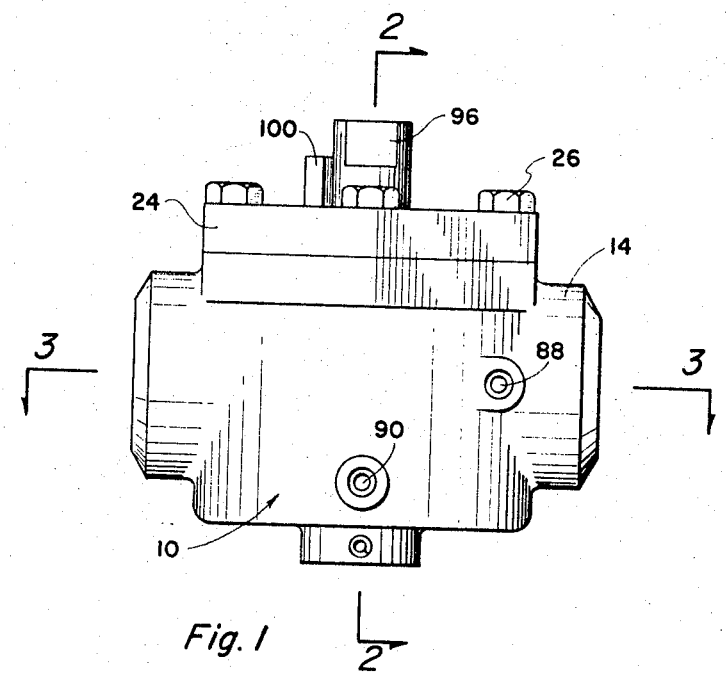
FIGURE 1 is a side elevational view of a dual orifice plug fitting embodying the invention.

Referring to the drawings in detail, reference character 10 generally indicates a dual orifice plug fitting comprising an outer housing 12 having opposed connection members 14 and 16 for facilitating interposing of the device 10 in a conduit, pipeline, or the like (not shown). The connection members 14 and 16 may be of any suitable type, such as threaded ends, weld type ends (as depicted herein), or flange ends, as desired. Inlet and outlet ports 18 and 20 are provided in the housing 12 and extend through the connection members 14 and 16 respectively, as is well known, in alignment with the interior bore of the pipeline or conduit. The housing 12 is provided with an opening 22 to provide access to the interior thereof and a cover plate 24 may be removably secured thereto in any suitable manner such as by a plurality of circumferentially shaped bolts 26.

A stationary plug member 28 is substantially centrally disposed within the housing 12 and is provided with an outwardly directed shank member 30 which extends through a bore 32 provided in the housing 12. The shaft or shank 30 is rigidly secured within the bore 32 in any suitable manner, such as by a pin 34 whereby the plug body 28 is retained stationary with respect to the housing 12. Suitable sealing means, such as an O-ring 36 or the like, is carried by the shank 30 or otherwise interposed between the shank 30 and bore 32 for precluding leakage of fluid therebetween.

Figure 3:
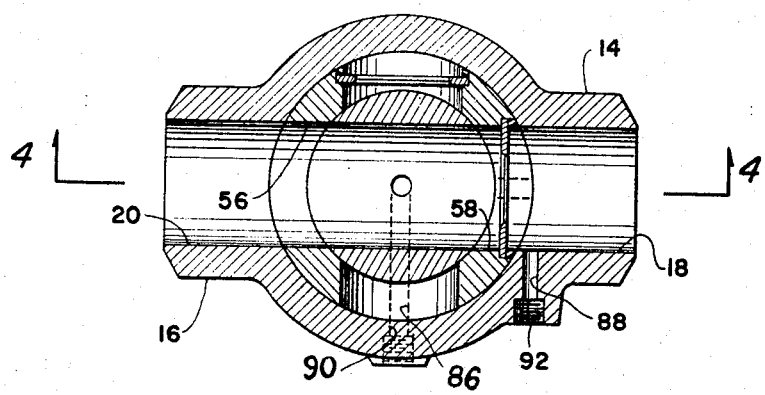
FIGURE 3 is a sectional view taken on line 3—3 of FIGURE 1.

The plug body 28 is provided with a centrally disposed bore 38 extending therethrough in alignment with the inlet and outlet ports 18 and 20. As particularly shown in FIGURES 3 and 4, the diameter of the bore 38 is substantially identical with the diameter of the ports 18 and 20 to provide a continuous flow passage of a uniform diameter through the structure 10 for a purpose as will be hereinafter set forth. An angled passageway 40 is provided in the plug body 28 to provide communication between the bore 38 and the exterior of the plug body 28.

Figure 2:
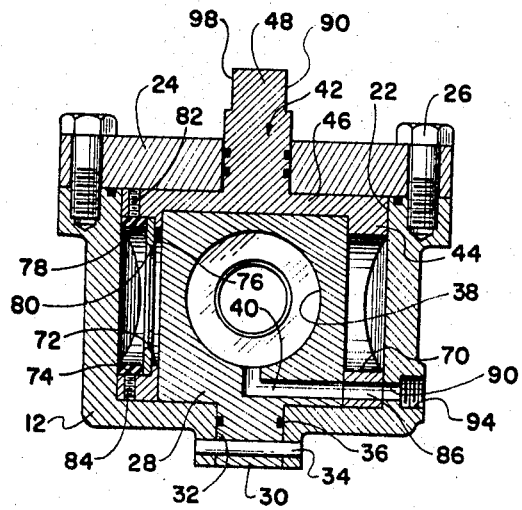
FIGURE 2 is a sectional view taken on line 2—2 of FIGURE 1.
Figure 4:
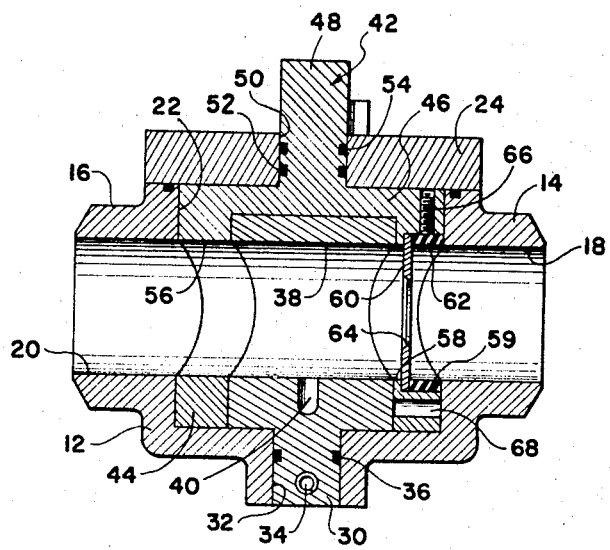
FIGURE 4 is a sectional view taken on line 4—4 of FIGURE 3.

A rotatable housing 42 is disposed within the housing 12 around the stationary plug 28 and comprises a cylindrical sleeve portion 44 having one end thereof open for receiving the plug 28 therein and the opposite end thereof closed by a wall 46 for bearing against the upper portion of the plug 28 as viewed in FIGURES 2 and 4. An outwardly directed shank 48 is substantially centrally disposed on the plate 46 and extends through a central aperture 50 provided on the cover 24. The shank 48 is suitably journaled within the bore 50 for independent rotation with respect thereto and suitable sealing means such as the O-rings 52 and 54 are preferably carried by the shank 48 or interposed between the shank 48 and the bore 50 for precluding leakage of fluid therebetween.

The sleeve 44 is provided with a first pair of diametrically opposed bores or ports 56 and 58. The bores 56 and 58 are of a diameter substantially equal to the bores 38 and 20 as clearly shown in FIGURES 3 and 4 wherein a passageway having a smooth internal periphery is provided. The bore 58 is enlarged at 59 for receiving an orifice plate 60 and retaining member 62 therein. The orifice plate 60 is provided with a central orifice or aperture 64 which is of a preselected diameter smaller than the diameter of the bores 38 and 58 and is disposed in axial alignment therewith. The retainer member 62 is of a substantially cylindrical configuration with the outer periphery thereof being of a diameter corresponding to the diameter of the bore 58 and the inner diameter thereof corresponding to the diameter of the bore 18. The bore 58-59 extends through the side wall of the cylindrical sleeve 44 and consequently is of an arcuate transverse configuration. The retainer member 62 is of an overall configuration complementary to the configuration of the bore 59 whereby one face thereof bears against the orifice plate 64 and the opposite thereof is flush with the outer periphery of the sleeve 44 surrounding the bore 58. A set screw 66 extends through the rotatable housing 42 and bears against the outer periphery of the retaining member 62 for securing the retaining member within the bore 58. A port or passageway 68 (FIGURE 4) is provided in the sleeve 44 spaced from the bore 58 for a purpose as will be hereinafter set forth.

A second pair of aligned ports 70 and 72 are provided in the rotatable housing 42 and have the longitudinal axes thereof substantially perpendicular with respect to the longitudinal axes of the bores 56 and 58. The bores 70 and 72 are of diameters substantially equal to the bores 38, 18 and 20 and the bore 72 is enlarged at 74 for receiving a second orifice plate 76 and retaining member 78 therein. The orifice plate 76 is provided with a centrally disposed orifice or aperture 80 similar to the orifice 64 but of a different diameter (as illustrated herein, the orifice 80 is of a larger diameter than the orifice 64) for a purpose as will be hereinafter set forth. The retaining member 78 is substantially identical with the retaining member 62 and is securely held in position in the enlarged portion 74 by suitable set screws 82 and 84 which are provided in the rotatable housing 42. A bore or passageway 86 (FIGURE 2) is provided in the sleeve 44 and spaced from the bore 70 for a purpose as will be hereinafter set forth.

A first metering bore is provided in the housing 12 to provide communication btween the bore 18 and the exterior of the housing 12 and a second metering port 90 is provided in the housing 12 to provide communication between the exterior of the housing 12 and the interior thereof in the proximity of the stationary plug body 28. Of course, the bores 88 and 90 may be provided with threaded portions 92 and 94, respectively, for receiving plug members (not shown) when it is desired to close the ports, or for receiving suitable fitting members (not shown) such as utilized in measuring the pressure of a flow stream. When the rotatable housing 42 is in a rotative position within the body 12 wherein the bores 56 and 58 are in alignment with the inlet and outlet ports 18 and 20, the passageway 86 is interposed between the passageway 40 and metering bore 90, as shown in FIGURE 2, whereby communication is established between the bore 38 and the exterior of the housing 12. When the rotatable housing 42 is in another rotative position within the body 12 wherein the bores 70 and 72 are in register with, or in alignment with the inlet and outlet bores 18 and 20, the passageway 68 (FIGURE 4) will be interposed between the passageways 40 and 90 to provide communication between the bore 38 and exterior of the housing 12.

The outer end of the shank 48 is preferably provided with oppositely disposed flat portions 96 and 98 for receiving a wrench, or other suitable tool (not shown) to function as a handle for facilitating rotation of the housing 48 within the body 12. A stop member 100 is provided on the outer surface of the cover member 24 for cooperation with the wrench or handle (not shown) utilized for rotation of the housing 42 in order to limit the rotation thereof in both a counterclockwise and a clockwise direction. When the housing 42 has been rotated in one direction through the maximum arc as allowed by the stop member 100 and cooperating handle, the bores 56 and 58 will be disposed in alignment with the inlet and outlet ports 18 and 20 and when the housing 42 has been rotated in an opposite direction through the maximum arc as allowed by the stop member 100, the bores 70 and 72 will be disposed in alignment with the inlet and outlet ports 18 and 20.

*Operation*

The dual orifice plug fitting 10 may be interposed in a pipeline, conduit, or the like, (not shown) in any well known manner whereby the inlet and outlet ports 18 and 20 of the body 12 will be in alignment with the interior bores of the pipeline in order to establish a continuous flow path through the fitting 10. Of course, suitable indicating means, such as an arrow or the like, may be cast or otherwise provided on the outer periphery of the body 12 or cover 24 for indicating the most desirable direction of flow through the structure 10.

The housing 42 may be rotated within the body 12 to position the bores 56 and 58 in alignment with the inlet and outlet bores whereby the flow stream moving through the pipeline will be directed through the orifice plate 60. In order to establish or determine the rate of flow of the flow stream, the pressure drop of the flow stream through the orifice 64 may be measured by taking measurements or pressure readings alternately at the first metering port 88 and second metering port 90, as is well known. Since the interior bores 18, 38 and 20 of the device 10 are of substantially the same diameter, turbulence within the fitting 10 will be greatly reduced or eliminated thereby resulting in an accurate determination of the pressure differential or pressure drop across the orifice plate. Thus, the rate of flow of the fluid stream may be accurately determined.

When it is desirable to utilize an orifice of a different size or diameter than the orifice 64 for any reason, the housing 42 may be rotated in a direction for positioning the bores 70 and 72 in alignment with the inlet and outlet ports. In this position, the orifice plate 78 will be in alignment with the inlet port 18 for receiving the fluid stream therethrough. The pressure drop across the orifice 80 may be measured as hereinbefore set forth to provide an accurate determination of the flow rate of the fluid stream.

When it is desired to further alter the size of the orifice during a gas or fluid metering operation, the rotatable housing 42 may be removed from the body 12 by removing the cover plate 24. The orifice plates 60 and 78 may be readily replaced with similar plates having the desired size orifice therein, and the housing 42 may be replaced in the body 12 and secured therein by replacing the cover 24 thereon. The metering operation may be accomplished in the manner as hereinbefore set forth. Of course, the flow of fluid through the device 10 must be terminated or interrupted during removal and replacement of the housing 42. In addition, it is to be noted that the inserts 62 and 78 may be constructed of any suitable material in order to provide a seal between the rotatable housing 42 and body 12 to preclude leakage of fluid therebetween.

From the foregoing, it will be apparent that the present invention provides a novel dual orifice plug fitting particularly designed and constructed for providing an accurate and efficient metering of the rate of flow of a fluid stream in a conduit, pipeline, or the like. The novel plug fitting is provided in an internally disposed stationary plug body having a bore extending therethrough of a diameter substantially equal to the diameter of the internal bores of the pipeline, thus substantially eliminating or greatly reducing any undesirable turbulence within the plug fitting during the metering operation. In addition, a rotatable housing is provided in the device for cooperation with the stationary plug to provide for varying of the orifice size without removal of the orifice plate from the interior of the structure. The novel dual orifice plug fitting is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims, without departing from the spirit of the invention.

What is claimed is:

1. An orifice fitting comprising an outer housing adapted to be interposed in a flow line, said outer housing being provided with inlet and outlet ports in substantial alignment with the internal bore of the flow line, a stationary plug body disposed within the housing and rigidly secured against rotation, said plug body being provided with having a bore extending therethrough in substantial alignment with the inlet and outlet ports, a rotatable orifice housing disposed within the housing and around the stationary plug body, a plurality of orifice plates carried by the orifice housing, each orifice plate being provided with an orifice of a different diameter, said orifice plates being movable with the plug body bore upon rotation of the orifice housing, said orifice housing being provided with a plurality of apertures for cooperation with the orifice plates to provide for flow of fluid through the orifice fitting, and metering ports provided in the outer housing for facilitating the measurement of pressure drop of the fluid moving through the orifice fitting.

2. An orifice fitting as set forth in claim 1 wherein the diameters of the inlet and outlet ports and plug body bore and apertures of the orifice housing are substantially equal for reducing turbulence in the fluid moving through the orifice fitting.

3. An orifice fitting as set forth in claim 1 wherein the orifice plates are removably secured to the orifice housing.

4. An orifice fitting as set forth in claim 1 wherein the plug body is provided with passageway means extending between the plug body bore and the exterior of the plug body, and the orifice housing is provided with passageway means for providing communication between the plug body passageway means and the metering ports for facilitating the measuring of the pressure drop of the fluid moving through the orifice fitting.

5. An orifice fitting as set forth in claim 1 wherein the orifice housing comprises a sleeve portion disposed around the plug body, said sleeve portion being provided with a first pair of opposed apertures of a diameter substantially equal to the diameter of the plug body bore, one of said orifice plates being removably secured in one of said first pair of apertures, and a second pair of opposed apertures of a diameter substantially equal to the diameter of the plug body bore, a second of said orifice plates being removably secured in one of said second pair of apertures, said first and second pairs of opposed apertures being selectively positioned in alignment with the plug body bore upon rotation of the orifice housing for selectively positioning the desired orifice plate in alignment with the plug body bore.

6. An orifice fitting comprising an outer housing adapted to be interposed in a flow line having a fluid stream moving therethrough and having opposed inlet and outlet ports, a stationary plug body rigidly secured within the outer housing against rotation and disposed between the inlet and outlet ports, said plug body being provided with a bore extending therethrough in alignment with the inlet and outlet ports and of a diameter substantially equal to the diameter of the inlet and outlet bores, a rotatable orifice housing disposed within the outer housing and around the plug body, a first pair of aligned apertures provided in the orifice housing and of a diameter substantially equal to the diameter of the plug body bore, a first orifice plate removably secured in one of said first pair of apertures, insert means disposed in said one aperture for retaining the orifice plate therein, a second pair of aligned apertures provided in the orifice housing and a diameter substantially equal to the diameter of the plug body bore, a second orifice plate removably secured in one of said second pair of apertures and having an orifice therein of a different size than the orifice of the first orifice plate, second insert means disposed adjacent the second orifice plate for retaining the plate within the respective aperture, stop means provided for limiting rotation of the orifice housing in both counterclockwise and clockwise directions whereby the first and second pairs of aligned apertures may be alternately positioned in alignment with the plug body bore whereby the orifice plates may be selectively positioned in alignment with the said plug body bore for receiving the fluid stream therethrough, a first metering port provided in the outer housing in communication with one side of the orifice plate through which the fluid stream is moving, and a second metering port provided in the outer housing in communication with the opposite side of the said orifice plate whereby pressure drop of the fluid stream across the orifice plate may be measured.

7. An orifice fitting as set forth in claim 6 wherein the outer periphery of the stationary plug body is substantially cylindrical and the inner periphery of the orifice housing is substantially cylindrical correspondng to the configuration of the outer periphery of the stationary plug body.

References Cited

UNITED STATES PATENTS

| | | | |
|---|---|---|---|
| 2,764,891 | 10/1956 | McGowen | 138—44 XR |
| 2,769,456 | 11/1956 | Atkinson | 138—45 XR |
| 3,209,779 | 10/1965 | McGowen | 138—44 XR |
| 3,321,970 | 5/1967 | Walker | 138—45 XR |

LAVERNE D. GEIGER, *Primary Examiner.*

HENRY K. ARTIS, *Assistant Examiner.*

U.S. Cl. X.R.

73—211; 138—46